United States Patent [19]

Yoshioka

[11] 4,026,572
[45] May 31, 1977

[54] MEANS FOR ISOLATING A VIBRATION OR SHOCK

[76] Inventor: Koji Yoshioka, 1858, Shuntokucho-1-chome, Higashiosaka, Japan

[22] Filed: July 3, 1975

[21] Appl. No.: 593,360

Related U.S. Application Data

[63] Continuation of Ser. No. 449,886, March 11, 1974, abandoned.

[30] Foreign Application Priority Data

Feb. 17, 1970 Japan .............................. 45-13714
Mar. 31, 1970 Japan .............................. 45-27272
Oct. 5, 1970 Japan .............................. 45-87640

[52] U.S. Cl. ............................. 280/276; 280/668
[51] Int. Cl.² ......................................... B62K 25/06
[58] Field of Search .......... 280/660, 662, 668, 692, 280/697, 276, 277, 283; 301/5 R; 305/7; 308/62, 182

[56] References Cited

UNITED STATES PATENTS

| | | |
|---|---|---|
| 771,171 | 9/1904 | Oliver .................................... 305/7 |
| 836,225 | 11/1906 | Sweeney ................................ 305/7 |
| 1,428,899 | 9/1922 | Nixon .................................... 305/7 |
| 2,812,953 | 11/1957 | Ronning ............................ 280/688 |
| 3,633,979 | 1/1972 | Trudeau ............................... 305/7 |
| 3,635,103 | 1/1972 | Monti ................................. 308/62 |
| 3,701,544 | 10/1972 | Stankovich ....................... 280/276 |
| 3,971,571 | 7/1976 | Yoshioka .......................... 280/276 |

*Primary Examiner*—Joseph F. Peters, Jr.
*Assistant Examiner*—John A. Carroll
*Attorney, Agent, or Firm*—Pollock, Vande Sande & Priddy

[57] ABSTRACT

The present invention provides means for isolating a vibration or a shock, comprising means for receiving the load, means for supporting the load receiving means rotatably about an axis thereof, and means for allowing a movement of said first axis along a circular path about a second axis spaced from and parallel to the first axis.

5 Claims, 40 Drawing Figures

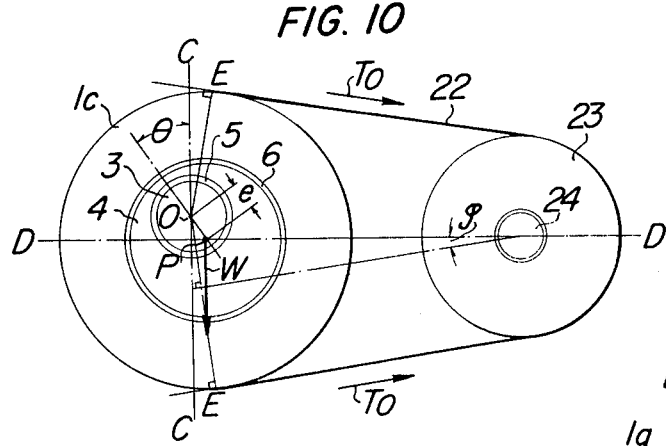
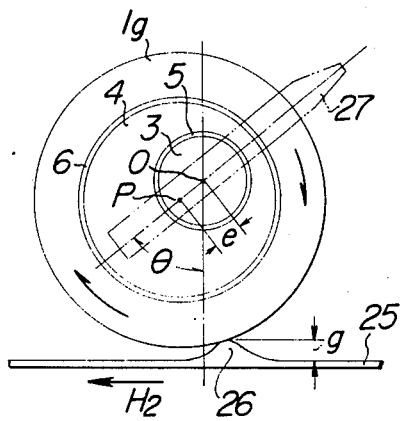
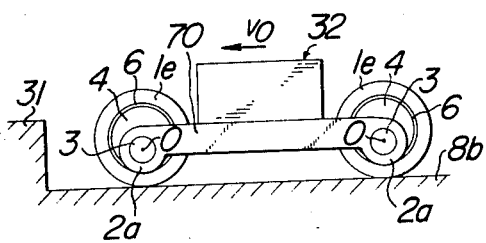
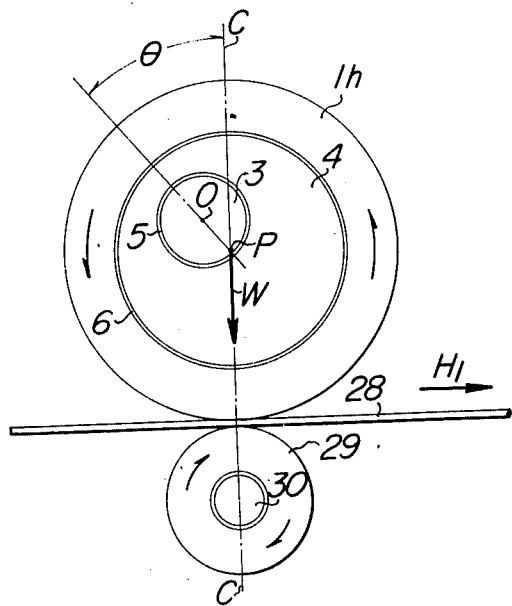
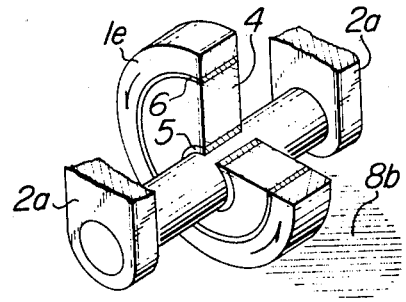

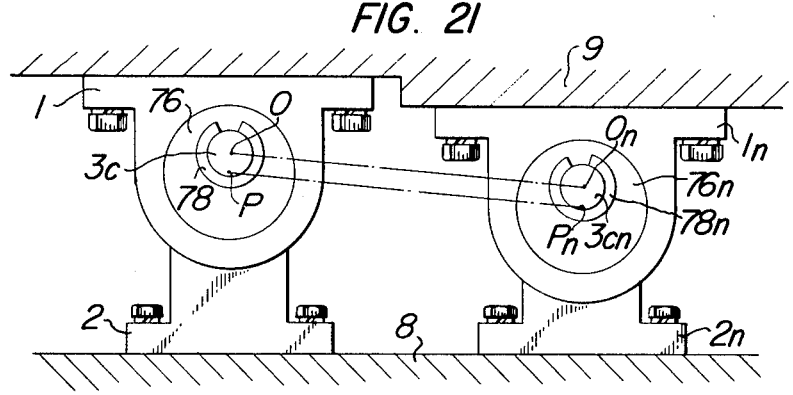
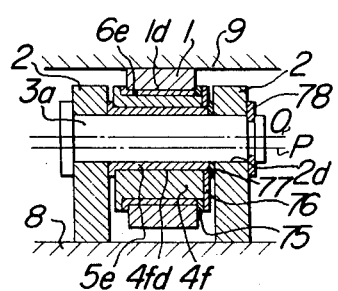
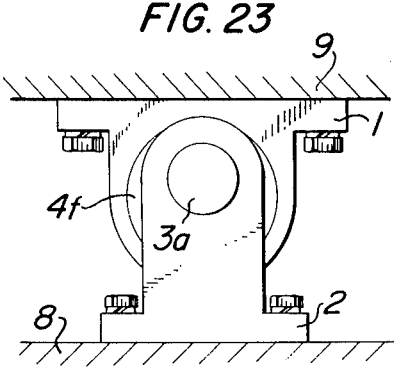
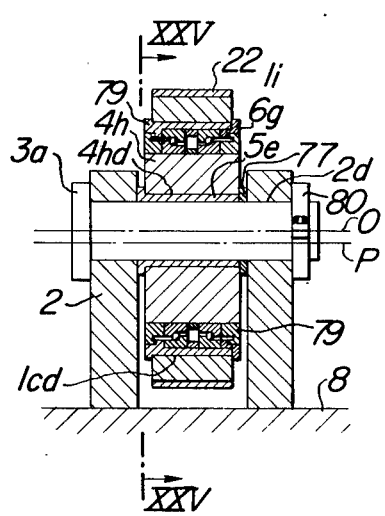
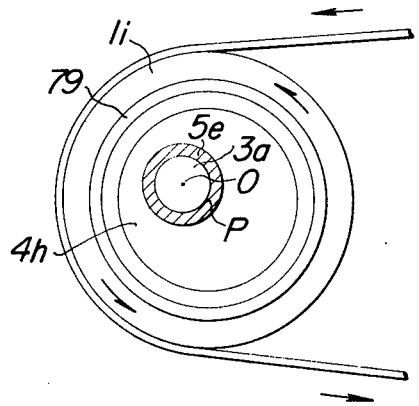

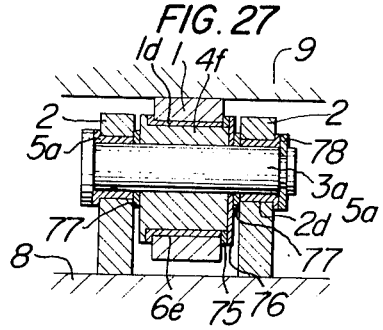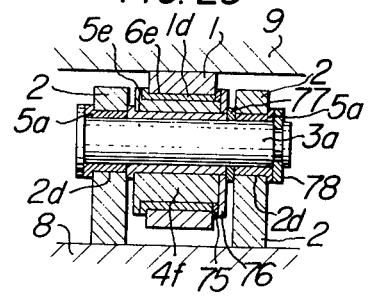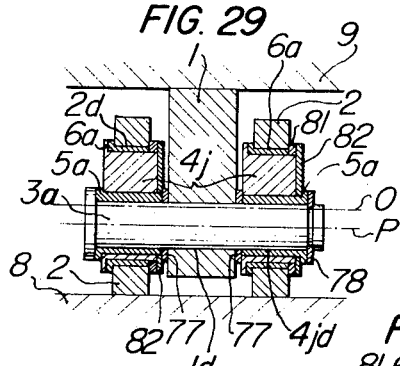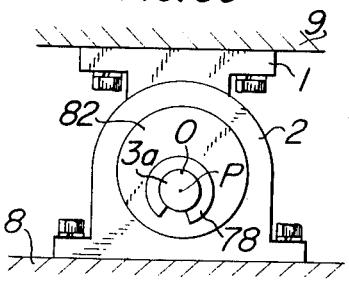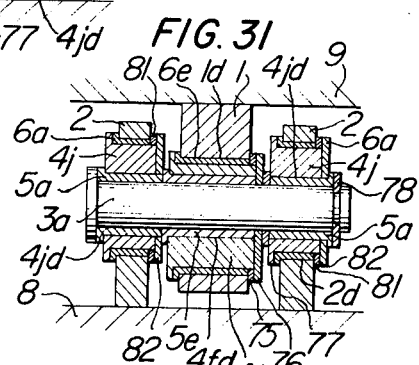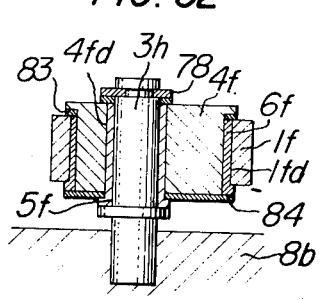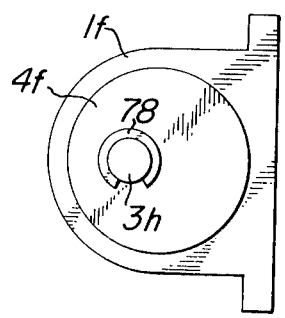

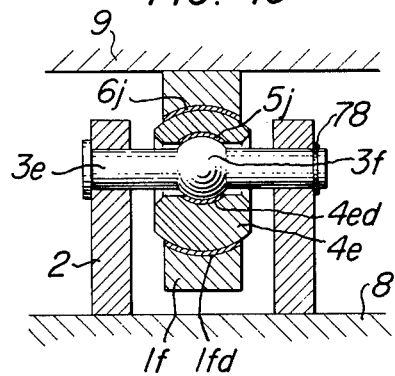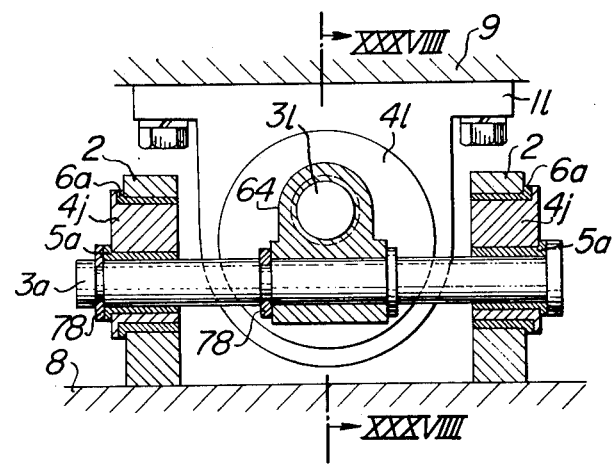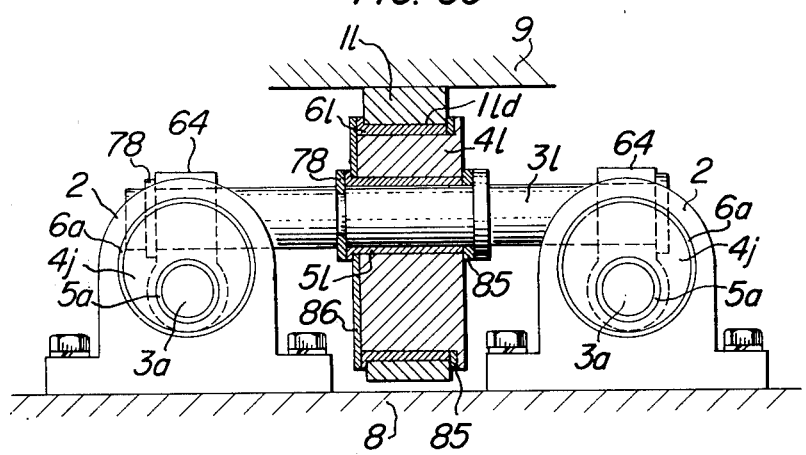

MEANS FOR ISOLATING A VIBRATION OR SHOCK

This is a continuation of application Ser. No. 449,886, filed Mar. 11, 1974 now abandoned.

BACKGROUND OF THE INVENTION

1. Field of the Invention

The present invention relates to means for isolating vibration or shock; more particularly the present invention relates to a novel means for isolating the vibration or the shock of a loaded housing from a support means for the loaded housing owing to provision of a circular displacement in the loaded housing, in which the loaded housing such as a loaded body supported by a shaft means is supported rotatably about an axis which can move along a circular path about a line parallel to said axis of rotation, whereby vibration or shock can be prevented.

For the purpose of the present invention, the wording "loaded housing" can be defined as a load bearing body which is supported through a shaft means. Thus, the loaded housing here may include members, such as, for example, a piston, a swing arm, a roll, a roller, a pulley, an impeller, a toothed wheel, a milling cutter, a grinding wheel, a flywheel, a dozer blade or a bucket of an earth-moving construction machine, and a wheel of a vehicle.

2. Description of the Prior Art

From the view point of a dynamics, a motion of a rigid body may be classified into two modes, that is, translation and rotation. A mechanical vibration may be divided into two categories, that is, a linear vibration system and a rotational vibration system. In this case, the rotational vibration system corresponds to the rotation and the linear vibration system corresponds to only the linear motion which is a branch of the translation. Accordingly, although a conception as to a circular vibration system corresponding to the rotation which is one mode of the translation must be made to the subject matter of study, in the past, the result of such study has scarcely been published.

In a conventional method for supporting a loaded housing, a bearing unit is employed between the loaded housing and a shaft supporting it. In such a conventional structure, since most bearing means have only freedom of rotation, such structure has defects that the bearing means simply supports the rotatably or swingably loaded housing, vibration or shock on the loaded housing being directly transmitted without being almost absorbed to a support housing holding the shaft through bearing means. Hitherfore, in order to prevent or absorb vibrations or impacts, it has been a common practice to insert a resilient material such as rubber or synthetic resin into a bearing mount, that is, between a bearing outer race and the housing or, in view of obtaining a good heat diffusion, to dispose a metallic spring, so that the housing is given another freedom of movement.

However, in view of the nature of the rotational movement, the following conditions have to be met in order that the housing is given another freedom of movement. First of all, in a resiliently supported housing, when it is displaced in response to vibrations or impacts applied thereto, the center axis of a mating hole formed in the housing for receiving a bearing must be maintained parallel to the center axis before it is displaced and the axis shall not be displaced in the axial direction. If this condition is not met, and if an angular displacement to the center axis of the mating hole is created, an angular momentum of the rotation is varied, and such variation of the angular momentum will disturb the rotation or swinging movement of the housing with the result that a smooth movement of housing is interrupted. Also, if the axial displacement is created, an additional thrust component will be created.

Secondly, the center axis of a mating hole formed in the housing for receiving a bearing must always be parallel to the center axis of the bearing throughout the displacement of the housing. If this condition is not met, a twist will be induced between the bearing and the shaft supported, thereby, resulting in an excessive concentrated stress. Therefore, the bearing is excessively damaged and its life is reduced.

Thirdly, the position of the loaded housing has to be easily and accurately determined irrespective of the amount of load on the housing. Since the loaded housing is accompanied with rotational or swinging movement, it is usual that the position thereof is precisely determined. For this reason, in order to facilitate assembling of a machine, the deflection of a resilient mount supporting a bearing must be accurately determined irrespective of the load on the housing.

It is impossible in principle to satisfy all of the above requirements simultaneously, preventing or absorbing vibrations or impacts by means of the aforementioned resiliently supported bearing.

Further, disadvantages of the prior art will be described hereinafter with reference to a support system of a wheel which is also a kind of a loaded housing. A conventional method for supporting a wheel include the type in which the wheel is only rotatable about the axis thereof such as in a bicycle, and another type, a so-called linear vibration system in which the wheel is rotatable about the axis thereof and, at the same time, vertically movable to absorb vibration and impacts transmitted from the wheel to a frame, the vertical movement of the wheel being resisted by a spring or a damper, as in an automobile, an aircraft, and a railway car. In any event, this method for supporting a wheel cannot provide any effect for absorbing longitudinal impacts.

Impacts encountered during aircraft landing will now be discussed. During landing, an aircraft is subjected to a shock load which is caused by a collision of the wheels onto the run-way and which is dependent on the rate of descent of the aircraft, and an acceleration shock load which is caused by the fact that the wheels are abruptly accelerated to a rotating speed corresponding to the horizontal speed of the aircraft.

Riding comfort is improved since the vertical vibrations or shocks on the car body can be remarkably reduced, however, there is no effect in absorbing longitudinal shocks or impacts. Therefore, a conventional suspension means is neither effective for absorbing longitudinal impacts such as those encountered during head-on collision or rear-end collision between cars or during car coupling operations, nor effective to prevent longitudinal shocks such as those experienced when a car to runs along an uneven surface, and during sudden start or sudden stop which often causes passengers to fall one on another in a railway train.

Further, an aircraft is subjected to an impact during landing due to an engagement with the surface of a runway. Moreover, it also has a problem in respect of safety during landing and expenses for operation due to the fact that wheels provided in landing gears are abruptly accelerated to a rotating speed corresponding to the horizontal running speed of the aircraft accompanied with heavy slippage between tires and the runway and remarkable tire wear.

Nowadays, it is possible to absorb vertical shocks acting on an aircraft during landing by using complicated and expensive damping means; however, there is no practical means for absorbing acceleration shocks on wheels. Thus, the acceleration shock loads are usually accommodated by increasing the strength of the wheels. However, this does not solve the basic problem and brings about several difficulties such as increased wheel costs, possible wheel skids due to the existence of rubber material adhered on the run-way during previous landings, and increased operational costs due to frequent replacement of wheels.

Further problems in vibration prevention or shock absorbing technique to which the present invention is applied will now be discussed.

Automobile accident involves very serious problems since drivers or other persons are injured and their lives are often lost through an accident. For this reason, it is now required that automobile seat belts and head restraints be provided. Among these, seat belts are used to prevent a so-called secondary collision in which an operator or passengers are forwardly thrown away from their seats towards a portion of the car body. Thus, the elongation of the seat belt must be limited within a predetermined maximum value which is determined by the space in the car body. However, one problem is that, since the belt elongation is closely related to damping characteristics, it is undesirable to simply reduce the value of belt elongation. When the belt elongation is limited to an excessively small value, the shock load on the car body will be transmitted to the passengers without being absorbed. Further, since only the bodies of the passengers are rigidly restrained in their seats, their head portions will abruptly be displaced with the result that neck portions are locally stressed and injured.

Therefore, it is essential in designing a seat belt to clearly determine the elongation of the belt from the view point that both prevention of the secondary collision and absorption of shock loads transmitted to passengers are balanced. Nevertheless, these points are not sufficiently taken into account.

On the other hand, a head restraint is used to prevent a passenger from being damaged at his neck portion upon rear end collision. However, the head restraint is not effective to restrain the movement of the passenger's head unless the head is located very close to the restraint. Thus, neck muscles cannot follow an abrupt movement of the head, and the human body is thrust forwardly leaving the head as it was causing an unusual posture which may create an excessive shear force, bending moment or tensile force at the neck portion.

From the above discussion, it will be noted that safety provisions against automobile accident are not satisfactory in respect of absorbing shock loads on a car body before the loads are transmitted to the passenger. A prior shock absorber has been ordinally constructed on the principle that the kinetic energy of one moving member is gradually absorbed and that a rapid change of velocity thereof has been eliminated by provision of the absorber in the face of a solid wall or other moving member upon collision of a moving member with the solid wall or other moving member. However, the absorber has the defect that the production of impacts therebetween may not be avoided, if the kinetic energy of the moving member is large and the efficiency of absorption of the shock of the absorber is below this kinetic energy.

According to a known machine, a resilient material such as vibration absorbing rubber is inserted between a vibration generating machine and a foundation thereof. However, in a machine such as a vacuum pumps, a centrifugal separator, or a drying machine in which a horizontal vibration is considerably generated as the horizontal vibration is always accompanied by rotational vibration, so that it is required to determine the natural frequency of both the horizontal and the angular vibration sufficiently lower than the frequency of the machine. In order to satisfy these requirements, it is necessary to select a resilient material having substantially lower coefficient of resiliency in the vertical direction. Thus, the support of the machine will become unstable and practically impossible to absorb vibration.

BRIEF SUMMARY OF INVENTION

It is a primary object of the present invention to provide means for isolating a vibration or a shock by producing a circular displacement in a loaded housing.

Another object of the present invention is to provide a means for isolating a vibration or a shock by which shock loads imparted on the loaded housing is prevented.

A further object of the present invention is to provide means for isolating vibration or shock in such a manner that the loaded housing can be displaced with the center axis of a shaft mating hole before and after displacement always parallel and without any axial displacement.

A still further object of the present invention is to provide means for isolating vibration or shock in such a manner that the center axis of a shaft mating hole in the housing is parallel to the center line of the bearing means even during displacement of the housing.

A further object of the present invention is to provide means for isolating vibration or shock, in which the loaded housing position can exactly be determined during assembly of the bearing means irrespective of the amount of load imparted on the housing.

A further object of the present invention is to provide means for isolating vibration or shock from a loaded housing such as a wheel, in which any longitudinal impact load impacted to the wheel is weakened before it is transmitted to a car body.

A still further object of the present invention is to provide means for isolating vibration or shock from a loded housing such as a wheel, in which the framework of the vehicle is not subjected to any longitudinal oscillation via a wheel despite the fact that the suspention thereof has a function for absorbng shock in the longitudinal direction.

A still further object of the present invention is to provide a means for isolating vibration or shock from a loaded housing such as a wheel for an aircraft, in which a vertical shock load impacted on the wheel during landing of the aircraft as well as an acceleration shock load impacted on the wheel can effectively be prevented.

A further object of the present invention is to provide a means for isolating vibration or shock, in which a horizontal oscillation can effectively be absorbed without utilizing a resiliency of a resilient material.

A further object of the present invention is to provide means for isolating vibration or shock, which is simple in construction and less expensive.

The above objects of the present invention can be accomplished by means for isolating vibration or shock, comprising means for receiving the load, means for supporting the load receiving means rotatably about an axis thereof, and means for allowing a movement of said first axis along a circular path about a second axis spaced from and parallel to the first axis.

According to another aspect of the present invention, means is provided for isolating vibration or shock, comprising loaded housing means for receiving load, eccentric means for supporting the loaded housing means with a freedom of rotation about a first axis thereof and another freedom of movement along a circular path about a second axis spaced from and parallel to said first axis.

BRIEF DESCRIPTION OF DRAWINGS

FIG. 10 is a diagrammatic view of a further embodiment of the present invention embodied in a pulley mechanism and explains a pre-tension adjusting feature obtainable in the mechanism;

FIG. 11 is a diagrammatic view showing a displacement multiplying action of the present invention;

FIG. 12 is a roll support mechanism embodying the present invention, the roll being effective to apply a constant pressure;

FIG. 13 is a partially broken away perspective view of a further embodiment of the present invention in which a vehicle wheel is supported in accordance with the invention;

FIG. 14 is a diagrammatic side elevation of a truck having wheels supported in accordance with the present invention;

FIG. 21 shows an example of the present invention in which two similar support mechanisms are used;

FIG. 22 is a longitudinal sectional view showing an embodiment of the present invention;

FIG. 23 is a front view of the arrangement shown in FIG. 22;

FIG. 24 is another example in which the present invention is embodied in a pulley mechanism;

FIG. 25 is a sectional view taken along the line XXV—XXV of FIG. 24;

FIGS. 27 and 28 show a sectional view of further embodiments of the present invention;

FIG. 29 is a sectional view of a further example of the present invention;

FIG. 30 is a front view of the arrangement shown in FIG. 29;

FIG. 31 is a sectional view of a further embodiment of the present invention;

FIG. 32 is a sectional view of a still further embodiment of the present invention;

FIG. 33 is a plane figure of the arrangement shown in FIG. 32;

FIG. 38 is a sectional view showing a further embodiment of the present invention in which the device is given with freedom of circular movements about two axes;

FIG. 39 is a section taken along the line XXXVIIII—XXXVIIII of FIG. 38;

FIG. 40 shows a further embodiment of the present invention in which a spherical bearing arrangement is employed.

DETAILED DESCRIPTION OF INVENTION

Figure 1:
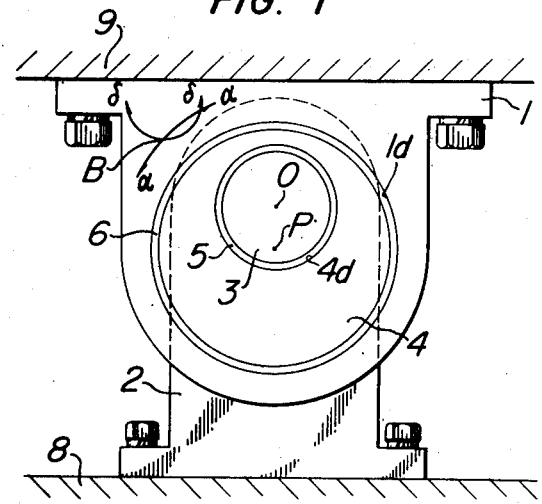
FIG. 1 is a diagrammatic elevational view showing an arrangement in accordance with the present invention.

An embodiment of the present invention will now be described with reference to FIG. 1. In the arrangement shown in FIG. 1 for supporting rotatably a loaded housing about an axis $p$ of rotation thereof, a loaded housing 1 is provided with a mating hole 1d having a central axis $p$. An eccentric member 4 having a cylindrical portion is rotatably received in the hole 1d through a bearing 6. Thus, the housing 1 is rotatable about the axis $p$. For the sake of simplicity, it is assumed that the eccentric member 4 is inserted into the housing 1 with its axis coinciding to that of the hole 1d. Thus, the axis of the eccentric member 4 is also shown by the reference $p$. Further, in order to make it possible that the axis $p$ can be moved along a circular path about a straight line $o$ which is parallel to the axis $p$, the eccentric member 4 is formed with an eccentric hole 4d having a center line coinciding to the line $o$. A shaft 3 is inserted at a portion thereof into the eccentric hole 4d through a bearing 5 and fixed at another portion to a mating hole formed in a support housing 2. When the shaft 3 is inserted into the eccentric member 4, the axis of the shaft 3 coincides with the line o.

As can be understood from the above description, when the eccentric member 4 is rotated about the axis p, the loaded housing 1 and the axis p are swingingly moved along a circular path having a radius equal to the distance between the lines o and p, as shown by an arrow S — S. In other words, the loaded housing 1 has two freedoms of movement as shown by α-α and S – S in FIG. 1.

Figure 2:
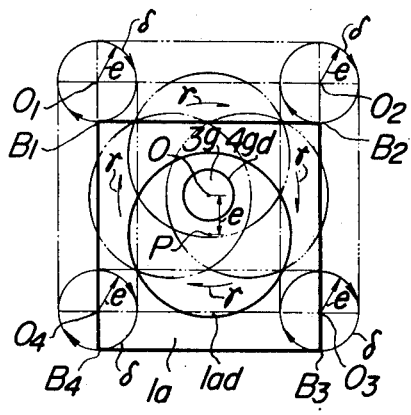
FIG. 2 is a diagrammatic illustration of movements obtained by the arrangement of the present invention.

In analyzing the circular movement of the loaded housing by dynamics assuming that the housing is a concentration of material points, the circular movement of the housing will cause an optional material pont Bn to move along a circular path having a corresponding center On and a radius c (See FIG. 2). This definition may be also applied to a circular motion of rigid body.

The circular movement of the loaded housing will further be analyzed by making reference to FIG. 2, in which the loaded housing comprises a square plate 1a having a mating hole 1ad for rotatably receiving an eccentric member 4g, said eccentric member 4g having an eccentric hole 4gd for rotatably receiving a portion of a shaft 3g, another portion of the shaft 3g being secured to a support (not shown). In FIG. 2, the reference e shows the distance between the center line o of the eccentric hole 4gd and the axis p of the member 4g. When the late 1a is moved along a circular path in the clockwise direction maintaining its bottom side horizontal, the eccentric member 4g is rotated clockwise about the axis o as shown by the arrow r (hereinafter, it is assumed that the center axis of the eccentric hole 4gd coincides with the axis of the shaft 3g). Thus, a point ($B_1$) at the left upper corner of the plate 1a is moved clockwise along a circle indicated by δ having a radius e centering around a point $O_1$. Similarly, a point $B_2$ at the right upper corner of the plate 1a, a point $B_3$ at the right lower corner, a point $B_4$ at the left lower corner or any point $B_n$ on the plate 1a are all moved clockwise along a circular path having centers at points $O_2$, $O_3$, $O_4$ or $O_n$, respectively and with a radius e. Thus, according to the present invention, when the loaded housing is moved along a circular path, each material point in the housing is moved along a circular path having a respective center and the same radius.

When the movement of the loaded housing is analyzed from a view point of a movement of a rigid body, it should be noted from the circles δ in FIG. 2 that the loaded housing is given with a mere translational movement the locus of which describes a circle. Hithertofore, there has never been proposed to give a loaded housing a freedom of such a circular movement, nor have there been any disclosed investigations with respect to such an arrangement.

An example of a practical embodiment will now be described. Referring to FIGS. 22 and 23, the reference numeral 1 shows a loaded housing which may be connected to a machine 9 generating vibrations or shocks. The loaded housing 1 is provided with a mating hole 1d into which an eccentric member 4f is rotatably inserted with the intervention of a bearing bushing made for example from an oil-containing metal or self-lubricating synthetic material such as Teflon. The eccentric member 4f is provided with an eccentric hole 4fd with a center line o parallel to the axis p of the member 4f. A shaft 3a is rotatably inserted at a portion thereof into the eccentric hole 4fd with the intervention of a bearing bushing 5e made for example from an oil-containing metal or Teflon. As apparent, the eccentric member 4f provides an eccentricity between the axis p—p and the center line o—o of the hole 4fd. The shaft 3a is secured at the opposite ends thereof to mating holes 2d in support housing 2 mounted on a foundation 8. The reference numerals 75 and 77 show ring-shaped bearing metals, 76 a disc for restricting the axial movement of the member 4f, and 78 a snap ring.

In the illustrated arrangement for supporting a loaded housing, when the machine 9 is caused to move in a plane perpendicular to the axis o of the shaft 3a along a circular path having a radius equal to the distance between the axis p of the mating hole 1d in the loaded housing 1 and the center line o of the hole 4fd, the eccentric member 4f is rotated within the bearing bushes 5e, 6e so that the loaded housing 1 is caused to move along a circular path.

Here, it should be noted that the loaded housing 1 has a freedom of circular movement and that the arrangement satisfies all of the aforementioned three requirements for providing a new freedom of movement. The first requirement that the center line p—p of the mating hole in the loaded housing must be parallel before and after the displacement and the displacement must be performed without being accompanied with any axial movement can apparently be met because the housing circular movement is a kind of translation movement and the movement is produced in a plane perpendicular to the axis of the shaft 3a. The second requirement that the axis p of the mating hole in the loaded housing 1 must always be parallel to the center line o of the bearing bushing 5e will unquestionably be met, provided that the movement is smoothly performed and the loaded housing 1, the support housings 2 and the eccentric member 4f are made of a rigid member or similar material. The third requirement that the position of the loaded housing 1 must easily be determined irrespective of the amount of load on the housing can also be met by selecting substantially rigid material or the similar material to avoid elastic displacement.

Referring again to FIGS. 22 and 23, when the vibration and the impacts incidental to the operation of the machine 9 are generated therein and an external force other than a vertical load is exerted on the shaft 3a, the eccentric member 4f is rotated within the bushings 5c, 6e resulting in a circular movement of the loaded housing 1. Thus, according to the arrangement of the present invention, in response to the circular movement of the loaded housing, there can be obtained a spring function, a vibration-preventing function and shock-absorbing function, which cannot be expected in prior arrangements.

Figure 3:
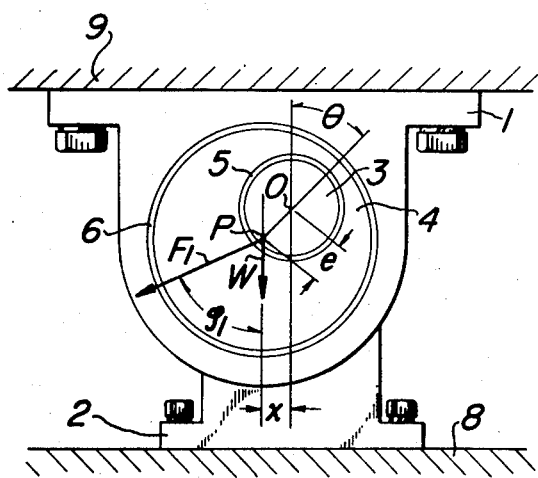
FIG. 3 is a diagrammatic elevational view for explaining a spring action obtained by the present invention.

The spring function obtained by the illustrated arrangement will now be explained. When the loaded housing 1 is displaced in a vertical plane, a spring function can be obtained. Referring to FIG. 3, when the loaded housing 1 is subjected to a force $F_1$ acting on the center line p of the mating hole in the housing 1 at an angle $\phi_1$ with respect to the vertical line, a horizontal displacement x of the housing 1 can be represented by the following equation.

$$x = e \sin \theta \quad (1)$$

where:

$e$ is the eccentricity which is equal to the distance between the axis $p$ of the eccentric member 4 and the axis $o$ of the shaft 3; and $\theta$ is the angular displacement of the axis $p$ of the mating hole in the loaded housing as measured from the vertical direction.

when the loaded housing 1 is in a balanced condition, the following relationship will be established from the balance of moments about the line $o$ of the eccentric member 4.

$$F_1 \cos\left(\frac{\pi}{2} + \theta - \gamma_1\right) = \overline{W} \sin\theta \quad (2)$$

where: $W$ is the load acting on the housing 1.

In this equation the mass of the eccentric member 4 is neglected. From the equations 1 and 2, the following relation can be obtained.

$$F_1 = \overline{W} \frac{x}{\sqrt{e^2 - x^2} \sin\gamma_1 - x \cos\gamma_1} \quad (3)$$

When the force $F_1$ is acting horizontally that is, $\phi_1$ is equal to $\pi/2$, the relationship between the horizontal force $F$ and the horizontal displacement $x$ is represented by the following equation.

$$F = W \frac{x}{\sqrt{e^2 - x^2}} \quad (4)$$

Figure 4:
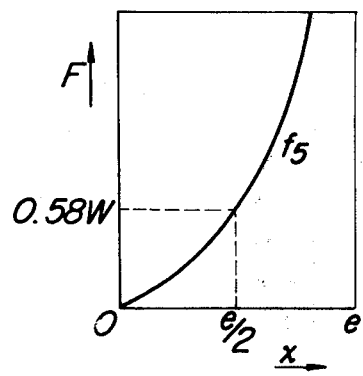
FIG. 4 is a diagram showing horizontal spring characteristics obtained by the present invention.

This relationship is diagrammatically illustrated in FIG. 4, as a horizontal spring characteristics curve $f_s$. As will be seen in this figure, the system has non-linear spring characteristics which depend on load. It is understood that the spring function in the arrangement of the present invention is provided due to a work for lifting the machine, in other words, due to absorption of energy as a potential energy. The spring above mentioned may be referred to as a gravity spring because the spring action is performed by the function of gravity.

The vibration preventing function will now be discussed. In designing a vibration preventing system by utilizing a horizontal spring action as shown in FIG. 4, since the amplitude to be considered in vibration prevention as very small, the spring characteristics within this amplitude may be considered to be sufficiently linear and may be analyzed by a linear theorem. This manner of analysis is considered to provide a practically sufficient accuracy. As apparent from FIG. 23, in the arrangement of the present invention, there will be no horizontal displacement under a static load even when there is any variation in the weight of the machine 9. Therefore, in the spring characteristics shown in FIG. 4, if the spring coefficient $k$ is determined by the inclination of the tangent line drawn at the point $x = 0$, the following relation can be obtained.

$$k = \frac{W}{e} \quad (5)$$

where: $W$ is the weight of the machine 9.

Thus, it will be understood that if the weight $W$ is decreased and the eccentricity $e$ is increased, a smaller spring coefficient can be obtained and the natural frequency of the device of the present invention is reduced resulting in an excellent vibration preventing effect. Here again, the mass of the eccentric member is neglected. Therefore, according to the present invention, it is only necessary to produce a circular movement in response to a horizontal movement of the machine, so that an effective vibration preventing effect can be obtained merely by inserting the means of the present invention between the machine and the foundation just like a conventional resilient member. According to the present invention, since no resilient member is used, the means can be used even in an environment in which the resilient member cannot withstand. Further, the means according to the present invention is simple in construction and has a sufficient strength.

Figure 5:
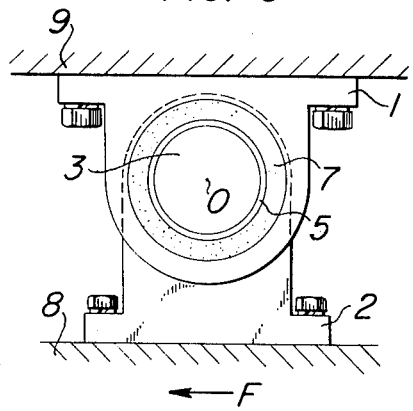
FIG. 5 is a diagrammatic view of a conventional arrangement for explaining shock transfer in the system.

The shock absorbing function will now be discussed. According to a conventional arrangement shown in FIG. 5, when a foundation 8 and a support housing 2 secured thereon are subjected to an impact load F, the speed is abruptly changed from $V_o$ to $V$ within a very short moment $t_1$ to $t_2$. The impact force $f_1(t)$ which acts on the machine 9 at this moment can be represented by the following equation.

$$\int_{t_1}^{t_2} f_1(t)dt = m(V - V_o) \quad (6)$$

where: $m$ is the mass of the machine.

Here, the displacement of a resilient member 7 is neglected since it is restrained. From this equation, it should be noticed that, in order to reduce the impact force $f_1(t)$ acting on the machine 9, it is necessary either to increase the time $(t_2 - t_1)$ during which the impact load acts or to reduce the speed change $V - V_o$.

Figure 6:
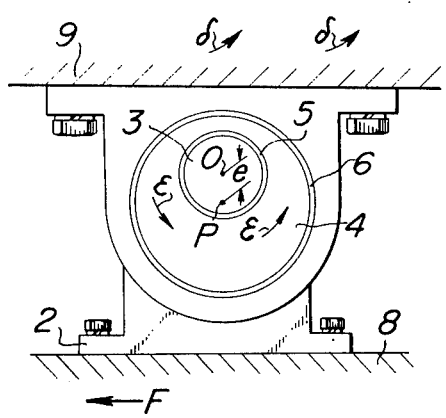
FIG. 6 is a diagrammatical view of a load supporting device in accordance with the present invention and explains the shock absorbing action obtainable therein.

According to the present invention, as shown in FIG. 6, the inertia of the loaded housing 1 generated in response to the speed change produced in the support housing 2 and the foundation 8 is applied to the axis $p$ of the eccentric member 4 so as to produce a moment about the axis $o$ of the shaft 3. Thus, there is produced a circular movement $\delta$ of the loaded housing 1 and the machine 9 simultaneously with a rotation $\epsilon$ of the eccentric member 4.

Referring again to FIG. 5, the machine 9 is subjected to an impact force $f_1(t)$ due to the fact that the machine 9 is restrained so that the machine 9 is subjected to a speed change within the same period as the loaded housing 2. By allowing the machine 9 to move along a circular path in response to the speed variation in the support housing 2, the time $(t_2 - t_1)$ during which the machine 9 is accelerated to a speed the same as the support housing can substantially be increased. The effect may vary in dependence on the eccentricity of the eccentric member 4, the steepness of the input load pulse, the weight of the machine and the friction of the rotating parts, but an increased effect will be obtained when the speed change of the support housing 2 per unit of time increases. As in the equation 6, a similar equation will be obtained as follows with respect to the impact force $f_2(t)$ on the machine 9.

$$\int_{t_1}^{t_3} f_2(t) dt = m(V - V_o) \quad (7)$$

Comparing the equation 7 with the equation 6 under equality of both right sides of the above equations. As $t_3$ is much more greater than $t_2$, the relationship between the maximum value of $f_1(t)$ and that of $f_2(t)$ can be represented as follows.

$$f_1(t)_{max} >> f_2(t)_{max} \qquad (8)$$

Thus, it has been proved that the arrangement of the present invention has a shock absorbing function.

The above shock absorbing function may readily be understood in connection with linkage bearings for supporting an implement of a construction machine by assuming that the foundation 8 is a dozer blade of a bulldozer or a bucket of a dozershovel and the loaded housing 1 is a arm of link. In this case, it should be be noted that there is a vibration damping effect applied by the earth.

Figure 7:
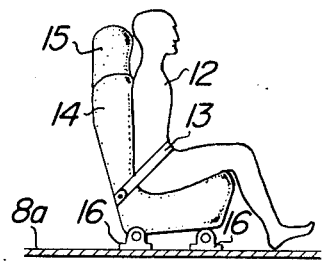
FIG. 7 is a side view showing another embodiment of the present invention embodied in a seat support mechanism.

When the present invention is applied to a support for a seat equipped in an automobile, it is possible to reduce the impacts which otherwise will be imparted on a passenger during car accident. In this case, the seat corresponds to the loaded housing. A passenger 12 is sitting on a seat 14 having a head restraint 15 with a seat belt 13 fastened as shown in FIG. 7. The seat 14 is supported on a car floor 8a by means 16 made in accordance with the present invention. Here, it should be noted that the maximum displacement of the passenger 12 produced in the means 16 of the present invention does not exceed the eccentricity e in FIG. 3. Thus, it is possible, by limiting the elongation of the seat belt 13 as small as possible and determining the eccentricity e below the maximum allowable displacement determined from the space in the car, to prevent a secondary collision and reduce the impacts transmitted to the body of the passenger 12. Thus, in the circular motion of the chair 14 there exists no break point which affords a rapid change of the direction of velocity as found in the linear motion.

The damping function of the present invention will now be described. According to the means of the present invention, as apparent from FIG. 6, the circular movement δ of the loaded housing 1 is induced simultaneously with the rotation ε of the eccentric member 4. In order to damp the vibration induced from these movements that a highly viscous silicon oil or the like may be applied at the rotatable supports so as to obtain an increased viscosity resistace; alternatively, it is desirable that a rotation ε about a shaft 3 of the eccentric member be transmitted to a rotatable dumper or the rotation is braked by a known conventional brake mechanism.

In the foregoing description, the loaded housing has been described as having a freedom of rotation but being of a desired shape. In fact, the present invention is applicable without any difference of basic function to a rotatable body such as a pulley a roll, a grinder and the like. Referring to FIGS. 24 and 25, the eccentric member 4h is rotatably received in a mating hole 1id of a pulley 1i. A belt 22 passes around the pulley 1i. The reference 79 shows a dust seal, and 80 a flange for restricting the axial movement of the shaft 3a. The mating hole 1id in the pulley 1i has a center coinciding to the axis p—p of the pulley 1i. Thus, it is important to make the rotating axis of the rotatable body coincide with the axis of the body.

With this arrangement, when the pulley 1i is rotated about the axis p, the eccentric member 4h is rotated about the axis o and, at the same time, the axis p of the pulley 1i is moved along a circular path in response to the radial input due to the variation in tension of the belt 22. In this case, the pulley 1i serves as the loaded housing and transmits the load from the belt 22 to the system comprising the eccentric member 4h, the shaft 3a and the support housing 2. Thus, the pulley 1i can be considered to be a kind of loaded housing.

Figure 8:
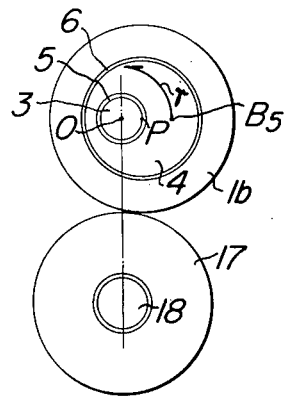
FIGS. 8 and 9 show a further embodiment of the present invention embodied in a rolling mill.
Figure 9:
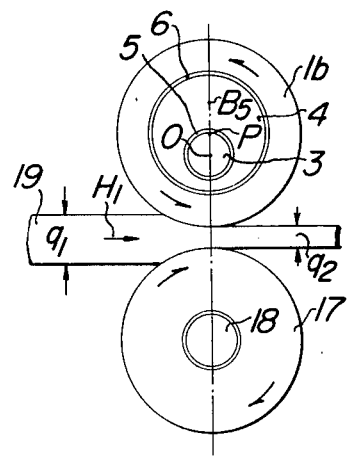

Next, it will now be explained that the present invention can be applied to achieve principally the same effect. This will be described taking reference to a roll used in a rolling mill and a grinding wheel for a grinding work. Referring to FIG. 8, a roll 1b is supported by an eccentric member 4, wherein a point $B_5$ in the member 4 has a freedom of rotation as shown by γ in the drawing. As shown in FIG. 9, when a plate material 19 is fed between the roll 1b and an opposing roll 17 in the direction shown by the arrow $H_1$, the rolls 1b and 17 are subjected to impact loads when the plate material 19 engages with the rolls. If the rolls 1b and 17 are stationary at this moment, they will be subjected only to radial impacts; however, in a normal operation, the rolls are subjected, in addition to the radial impacts, to an impact torque which acts to decelerate the rotation of the rolls.

Here, the impacts $f_3(t)$ which are imparted to the plate material 19 and the impact torque $T(t)$ imparted to the roll 1b can be represented by the following equations.

$$\int_{t_1}^{t_2} f_3(t)dt = M(V - V_o) \qquad (9)$$

$$\int_{t_1}^{t_2} T(t) dt = I(\quad - \quad_o) \qquad (10)$$

where:
$M$ is the mass of the plate material 19;
$I$ is the moment of inertia of the roll 1b;
$t_1 - t_1$ is the duration time of the impact;
$V_o$ and $V$ are the speeds of the plate material 19 before and after the plate material engages with the rolls, respectively; and
$\omega_o$ and $\omega$ are the angular velocities of the roll 1b before and after the plate material engages with the rolls.

When the plate material 19 of thickness $q_1$ engages with the rolls 1b and 17, the eccentric member 4 is rotated about the axis o of the shaft 3 as shown by an arrow γ, and the roll 1b is moved along a circular path in response to the rotation. Further, when the axis p of the eccentric member 4 reaches a position right above the axis o of the shaft 3, the gap $q_2$ between the rolls 1b and 17 attains the maximum value, so that the freedom of circular movement is lost.

As apparent from the above description, the plate member 19 has a work, that is, the plate material 19 gives kinetic energy $E_1$ to the roll 1b and the eccentric member 4, but again receives the kinetic energy $E_1$ from them after the gap between the rolls 1b and 17 becomes the maximum. Further, the plate 19 performs a work to lift the roll 1b and the eccentric member 4. By this work, the impact duration time $(t_2 - t_1)$ in the plate material 19 and the roll 1b in the equations 9 and 10 is increased than in a conventional roll arrangement, so that both the radial impacts and the impact torque can simultaneously be absorbed.

Further, when the loaded housing is embodied in the form of a rotary body, the following functions can also be obtained.

First of all, this arrangement has the function of setting the initial tension. In a belt type power transmission device, a belt is under a uniform tension when it is stationary. This uniform tension is called an "initial tension". In FIG. 10, the belt 22 passing around the pulley 1c is stationary. In this instance, the belt 22 is under a uniform initial tension $T_o$. Due to this tension, when the eccentric member 4 is balanced at a position displaced by an angle $\theta$ from the vertical line c—c, the balance of moments about the axis $o$ of the shaft 3 will lead the following equation.

$$T_o\{R - e\cos(\phi - \theta)\} + e W \sin\theta = T_o\{R + e\cos(\phi + \theta)\} \quad (11)$$

where:
- R is the radius of the pulley 1c;
- e is the eccentricity between the shaft 3 and the pulley 1c;
- $\phi$ is the angle between a plane DD passing through the axes of the pulleys 1c and 23 and the belt 22; and
- W is the total weight of the eccentric member 4 and the pulley 1c.

In FIG. 10 the line OE is a normal line of the belt 22 passing through the point $o$.

The equation (11) can be written as follows.

$$T_o = \frac{1}{2} \frac{\tan\theta}{\cos\gamma} W \quad (12)$$

when the angle $\phi$ is small, $\cos\phi \approx 1$, so that the equation (12) can be writted as follows.

$$T_o = \frac{1}{2} W \tan\theta \quad (13)$$

From this equation, the initial tension $T_o$ can be determined from the total weight W of the eccentric member 4 and the pulley 1c, and the angle of rotation $\theta$ of the eccentric member 4. Thus, it is possible to readily and exactly determine the value $T_o$ as desired by varying the value W through an addition or subtraction of weight to and from the eccentric member 4, or by varying the value of angle of rotation of the eccentric member 4.

Secondly, this arrangement has a displacement multiplying function. As shown in FIG. 11, a sheet material 25 is moving in the direction $H_2$ with the roll 1g contacting therewith and rotating about the axis $p$. It is possible by this arrangement to multiply the height g of a projection 26 on the sheet material 25 and indicate as an angle of rotation $\theta$ of the eccentric member 4.

In FIG. 11, the relationship between the angle $\theta$ and the height g can be shown by the following equation using the value of eccentricity e between the axis $p$ of the roll 1g and the $o$ of the shaft 3.

$$\cos\theta = 1 - \frac{g}{e} \quad (14)$$

From the equation 14, it will be apparent that, with the eccentricity of 0.5 mm, a projection of 1 mm high will produce a 180° rotation of the eccentric member 4. Thus, a slight change in height can be multiplied and indicated as an angular displacement. Then, the rotation of the eccentric member 4 may be indicated by a needle 27 secured to the eccentric member 4. The needle 27 may be further utilized to actuate a limit switch (not shown) of a thickness detecting means of a control system.

Thirdly, the arrangement has a pressure control function. As shown in FIG. 12, in order to apply a constant pressure on a film 28 moving in the direction $H_1$ by the roll 1h, the roll 1h is put into contact with the film 28 with the plane through the axis $p$ of the roll 1h and the axis $o$ of the shaft 3 making an angle $\theta$ with a vertical plane c—c. In this instance, the distribution of the contact pressure is substantially determined by the total weight W of the roll 1h and the eccentric member 4, and the contact area S between the roll 1h and the film 28. Thus, it is apparent that the pressure distribution at the contact surface between the roll 1h and the film 28 can be maintained substantially constant by suitably selecting the diameter of a drive roll 29 or the speed of the film 28 in such a manner that there will be no remarkable change in the value S.

In the drawing, if the film 28 is fed in the direction opposite to the arrow $H_1$, the roll 1h is subjected to a torque about the axis $o$ of the shaft 3 due to the friction at the contact surface between the roll 1h and the film 28. Since this torque produces a force which acts to press the film 28, the contact pressure applied by the roll 1h to the film 28 is correspondingly increased. Thus, when the film 28 is fed in the reverse direction, there will be a pressure increase.

Figure 26:
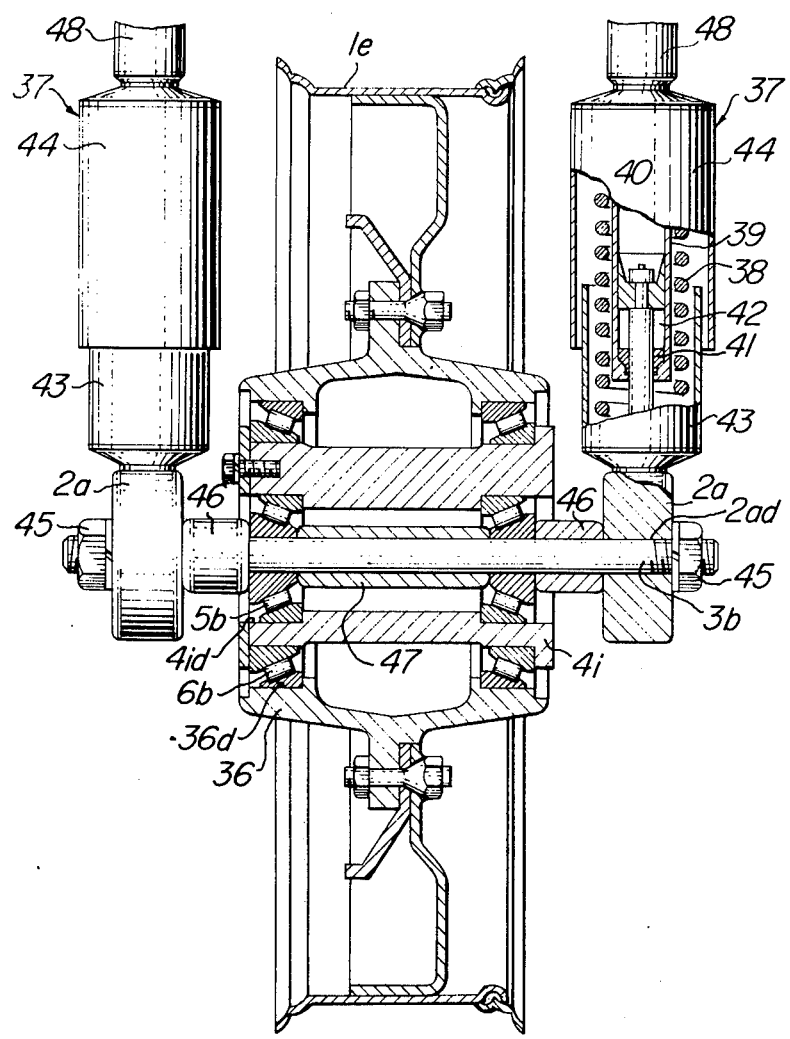
FIG. 26 is a sectional view of a further embodiment in which the present invention is embodied in a suspension system.

In the foregoing descriptions, the present invention has been described with respect to the loaded housing of a generic form, and a rotatable body such as a pulley and a roll. It is to be added herein that there is not any principal difference where the loaded housing takes the form of a vehicle wheel. An example in which the present invention is embodied in a vehicle wheel will now be described, making reference to the drawings. Referring to FIG. 26, the loaded housing takes the form of a disc wheel 1e for securing a tire, The disc wheel 1e has a hub 36 secured thereto and having a mating hole 36d with a center coinciding with the axis of the disc wheel 1e. The cylindrical eccentric member 4i is rotatably inserted into the hole 36d with the intervention of conical roller bearings 6b. The eccentric member 4i has an eccentric hole 4id having an axis parallel to the axis of the eccentric member 4i. An axis 3b is rotatably inserted into the eccentric hole 4id through conical roller bearings 5b and has on its each end a known for of suspension unit 37 secured thereto at the hole 2ad formed in the lower end portion 2a. The suspension unit 37 comprises a combination of a coil spring 38 and a hydraulic damper. The lower end portion 2a of the suspension unit 37 is secured to the axle 3b by a nut 45 and spacers 46 and 47 so as to restrict the rotational and an axial movements of the axle 3b. The suspension unit 37 corresponds to the support housing in the previous examples and the rotating axis in the wheel 1e coincides, as in the previous examples of rotatable bodies, to the axis of the wheel itself. The hydraulic damper comprises a damper cylinder 39, a plunger 40, an oil seal 41 and hydraulic oil filled in the cylinder. Although not shown, the upper end portion 48 of the suspension unit 37 is secured to a frame (not shown) of a car body. The reference numeral 43 shows a lower cover which is smaller in diameter than an upper cover 44 and telescoped into the cover 44. When it is not required to provide a freedom of movement in the vertical direction, the suspension unit 37 may be omitted and the axle 3b may be directly secured to the car body frame.

As apparent from the above description, when the loaded housing takes a form of a vehicle wheel, it is only necessary to add principally an eccentric member 4$i$ and conical roller bearings 6$b$ to a conventional wheel suspension arrangement. By the addition of the eccentric member 4$i$ and the conical roller bearings 6$b$, the member being rotatable about the axis of the axle 3$b$, and the disc wheel 1$e$ being rotatable with respect to the eccentric member 4$i$. Thus, the disc wheel 1$e$ or the tire can have another freedom of movement along a circular path having a radius equal to the eccentricity between the axis of the wheel 1$e$ and that of the axle 3$b$.

When the wheel is restrained by a road surface such as in the case of a wheel running on the surface, it may be considered that the axle has a freedom of circular movement with respect to the wheel. Furthermore, as in this embodiment, when the axle is secured to the suspension unit 37 which corresponds to the support housing, it may be considered that the support housing has a freedom of circular movement with respect to the wheel.

When the wheel in accordance with the present invention rolls on a surface, since the axle 3 is offset from the axis of the wheel 1$e$ as shown in FIG. 13, it may at a glance be considered that the axle 3 is vertically moved in response to the rotation of the wheel 1$e$. However, it has been found that no vertical movement of the axle 3 is produced when the wheel 1$e$ rolls on a flat surface 8$b$ at a constant speed.

This will be explained as follows. In FIG. 13, when the wheel 1$e$ is rolled along a flat surface, there may possibly be produced two movements, that is, a rolling movement of the wheel 1$e$ and the circular movement of the axle 3. Between the two movements, the rolling of the wheel 1$e$ is not accompanied with a vertical movement or a variation in potential energy, while the circular movement of the axle 3 is accompanied with a vertical movement resulting in a variation in potential energy. Therefore, in a normal operation, only the rolling movement of the wheel 1$e$ will be produced. It is when the driving condition of wheels is changed such as when the wheel 1$e$ is rolling on a rough surface, during acceleration or deceleration, or when there is a change in rolling resistance that the axle 3 is moved along a circular path. The reference numeral 2$a$ in FIG. 13 shows a support housing on a car body. It should be understood that the wheel 1$e$ is a kind of loaded housing in that it serves to transfer the load imparted from the road surface to the system comprising the eccentric member 4, the axle 3 and the support housing 2$a$. Thus, the loaded housing as used herein is broad enough to include a vehicle wheel.

The longitudinal shock absorbing action in the arrangement of the present invention will now be described. Referring to FIG. 14, suppose that a truck 32 having a wheel 1$e$ of the present invention is running on a surface 8$b$ and the wheel 1$e$ abuts on obstacle 31.

Figure 15:
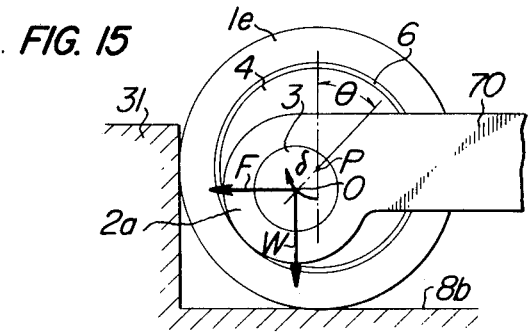
FIG. 15 is a view of the front part of the truck shown in FIG. 14, the front wheel being shown in the position it assumes just after collision with an obstacle.

With respect to the behavior at the time of collision, it can be considered that, at first, the wheel 1$e$ abuts against the obstacle 31 as shown in FIG. 15, and the axle 3 is moved together with the car body 70 along a circular path as shown by $\delta$, in response to the rotation of the eccentric member 4 about the axis $p$. The shock absorbing action obtained at this period can be explained as follows. According to prior arrangement, when a wheel abuts an obstacle, the direction of movement of the wheel is suddenly changed after collision with the obstacle. In other words, the trace of the wheel will have a sudden change of direction of its movement at a certain point, i.e., break point. Therefore, in a prior arrangement, it is essential to make the wheel pass this break point slowly. In contrast to this, according to the present invention, the direction of the movement is gradually changed due to the circular movement, so that the break point is completely eliminated and no remarkable shock will be produced.

By providing a freedom of circular movement to the wheel for the purpose of obtaining a longitudinal shock absorbing characteristics, various advantages will be attained other than those described above, as compared with a wheel which has a freedom of longitudinal movement.

1. The axle can have a stable balanced position:
2. The structure can be simplified since the freedom of circular movement is provided by two pairs of offset rotating parts.

Further, as will become clear from the following description, the wheel in accordance with the present invention has a damping action as well as a shock absorbing action which is effective to the landing shock and the acceleration shock as encountered during landing of an aircraft. The damping action in the wheel supported in accordance with the present invention will now be described. Hithertofore, the displacement in a vibration preventing or damping device has been reversible and the displacement has been performed along the same path in two directions, so that it has been usual to induce an oscillation due to a spring reaction. Therefore, it has not been possible to provide a spring action in longitudinal direction in a suspension system. On the other hand, according to the present invention, an unexpected result can be obtained in that no oscillation is induced.

Figure 16:
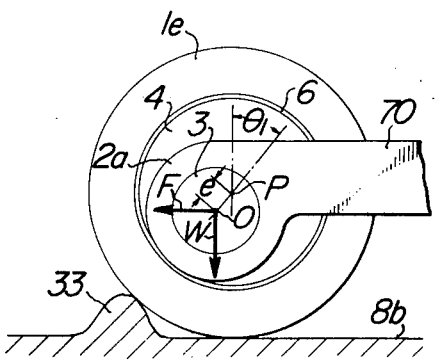
FIG. 16 is a view similar to FIG. 15 but showing the front wheel in a position just after collision with a projection on a surface on which it is running.
Figure 17:
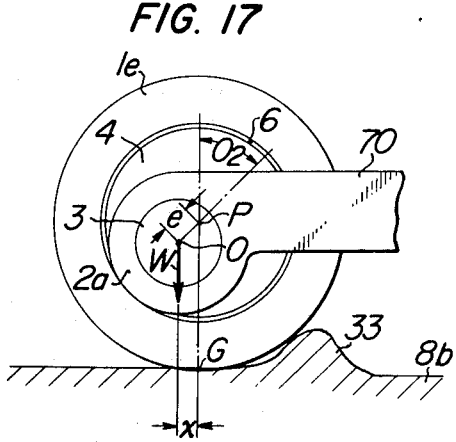
FIG. 17 is a view similar to FIG. 16 but showing the front wheel in the position it assumes as it passes over the surface projection.

Referring to FIG. 16, when a wheel 1$e$ running on a flat surface 8$b$ abuts a projection 33 of such a height that can be got over by the wheel, the axle 3 is subjected, in addition to the load W, to an external force F produced by the abutment, with the result that the axle 3 is moved along a circular path by an angle $\theta$. After the wheel 1$e$ gets over the projection 33, the axle 3 is subjected, as shown in FIG. 17, only to the load W so that the axle 3 is returned downwardly. In this instance, the direction of the load W pass a point displaced by a horizontal distance $x$ corresponding to an angular displacement $\theta_2$ from the point G of contact to the ground, so that the wheel 1$e$ is subjected to a counterclockwise moment W, $x$ about the point G. Thus, the wheel 1$e$ is rotated forwardly and the eccentric member 4 is correspondingly rotated. During this period, the potential energy of the axle 3 is converted again to the kinetic energy of the axle 3, the wheel 1$e$ and the eccentric member 4.

When the axis $o$ of the axle 3 assumes a position offset vertically downwardly from the axis $p$ of the wheel 1$e$ by an amount $e$, the axle 3 will have a tendency to oscillate due to the inertia force of the eccentric member 4; however, this tendency can be overcome by the load W acting on the axle 3. This can be confirmed by the fact that the oscillation of the axle 3 can remarkably be reduced by increasing the load. Since the damping action is derived from the influence of gravity, the action may be called a gravitational damping.

Thus, although the axle 3 is displaced by an angle $\theta_1$ under the influence of an external force F, it is displaced vertically during the return stroke, so that there is no tendency of producing an adverse effect on the running characteristics. This is remarkable and provides an unexpected result because it has been believed that, in a suspension system having a longitudinal spring function, a reversible spring will produce a longitudinal oscillation due to a spring reaction during a return stroke giving an adverse effect on the running characteristics.

In view of the fact taht the circular movement of the axle thus has a damping action, the wheel in accordance with the present invention will now be discussed with respect to its behavior when it is rotated. When a wheel running on a surface at a constant speed is subjected to a longitudinal impact due to the uneveness of the surface, the impact may for example take a pulse form as shown by $f_4$ in FIG. 18 in which the load W on the car body is taken in the ordinate and the time T in the abscissa.

Figure 18:
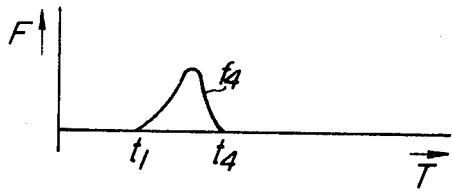
FIG. 18 is a diagram showing a longitudinal damping action of the present invention.

As apparent in FIG. 18, in the wheel support in accordance with the present invention, when the wheel is subjected to a longitudinal impact, the impact force, which is indicated by the pulse $f_4$, remaining in the car body does not exist as long as a half cycle, so that there will be no adverse effects on the running characteristics. Thus, the wheel embodying the present invention effectively solves the problem of the prior art that, when a suspension system is provided with a longitudinal spring action, an impact acting on the wheel produces an oscillation between the car body and the wheel, and the running characteristics are adversely effected.

It has been known that a resonance is experienced when the frequency of the external forced vibration substantially coincides to the natural frequency of a vibration system. Therefore, the problem of resonance is the most important one in designing a vibration system. However, in the wheel embodying the present invention, the wave configuration of the shock force applied to the body is substantially in the form of a pulse, as shown in FIG. 18, so that there is no problem of resonance in connection with the circular vibration. This is an advantage over a conventional system.

The shock absorbing function against the landing shock and the acceleration shock in the wheel as experienced in an aircraft will now be discussed.

Figure 20:
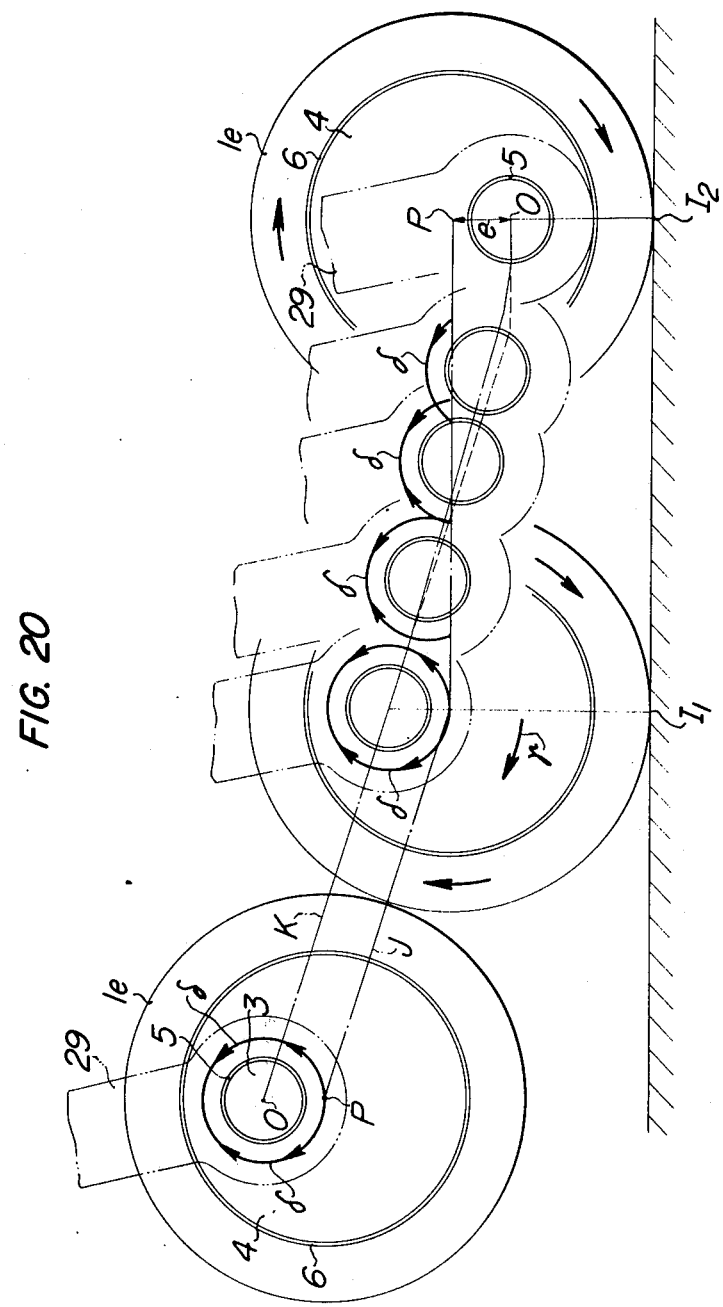
FIG. 20 shows the movement during landing of an aircraft landing gear embodying the present invention.

FIG. 20 shows the locus of the wheel 1e and the axle 3 before and after landing without any bouncing from a runway, in the case of utilizing of the landing wheel embodying the present invention. In the drawing, the reference J shows the path of the axis p of the wheel 1e, k the path of the axis o of the shaft 3, and e the amount of eccentricity between the wheel 1e and the shaft 3. From the drawing, it can be understood that the relative vertical positions of the axis p of the wheel 1e and the axis o of the shaft 3 are changed with each other at the point L.

At the moment $I_1$ when the wheel 1e engages with the runway 8b, the wheel 1e has a freedom of movement along a whole circle having a radius equal to the distance between the axis p and the axis o of the shaft 3. However, as the shaft 3 is lowered, since the distance between the shaft 3 and the runway 8b is decreased, the length of the arc, along which the wheel 1e can be moved, is gradually decreased and finally, at the position $I_2$ where the axis o of the shaft 3 is directly below the axis p of the wheel 1e, the wheel 1e does not have a freedom of circular movement.

The landing shock is produced due to the fact that, at the moment when the wheel engages with the runway, the aircraft and the runway react with each other so that the speed of the aircraft is discontinuously changed. According to the wheel support of the present invention, however, as shown in FIG. 20, the axle 3 or the aircraft reacts with the runway 8b through the wheel 1e and the eccentric member 4, and no impact load will be produced since the wheel 1e has a freedom of circular movement $\delta$ and the eccentric member 4 has a freedom of rotation $\gamma$ about the axis o of the axle 3, as far as the wheel is between the positions $I_1$ and $I_2$. However, since the force produced in this instance is too small, the rotating movement $\gamma$ of the member 4 is usually resisted by for example, a brake or a rotation damper to increase the energy absorption. By this arrangements, the path k can be made smoother as shown by a solid line than that shown by a broken line. Thus, the impact duration time can be increased and an abrupt change of momentum can be supressed so that the impact on the aircraft can be reduced.

Figure 19:
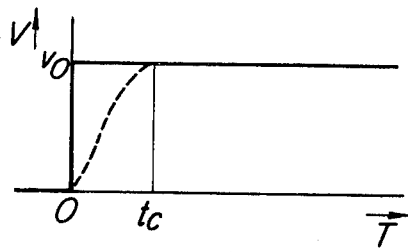
FIG. 19 is a diagram showing a peripheral speed change of a tire in a conventional arrangement during aircraft landing.

FIG. 19 shows a change in the wheel peripheral speed during aircraft landing. At the moment $T = 0$ of landing, the wheel peripheral speed is zero but the wheel is subjected to a stepwise acceleration until it attains a peripheral speed equal to the horizontal speed $V_o$ of the aircraft. However, in an actual case, since the wheel has inertia, the wheel only starts to rotate at the moment $T = 0$ and attains the peripheral speed $V_o$ at the time $T = tc$ as shown by a dotted line. Therefore, during the period from $T = 0$ to $T = tc$, there is produced a heavy slip between the wheel and the runway. This slippage causes, together with an impact load due to the abrupt engagement between the wheel and the runway, a substantial frictional work on the wheel, so that the wheel is severely worn.

If it is possible to reduce the load imparted on the wheel during initial acceleration of the wheel when there is a great difference between the wheel peripheral speed and the horizontal speed of the aircraft, the depressing force acting on the wheel toward the runway can be decreased, resulting in a reduced frictional work. Referring to FIG. 20, the wheel 1e is accelerated due to the torque produced by the engagement with the runway between the points $I_1$ and $I_2$, however, during this period, since the wheel 1e has a freedom of circular movement $\delta$, it is not subjected to an impact upon landing. Thus, it is effective in the arrangement of the present invention to avoid heavy frictional work during the initial wheel acceleration period which is the most important period from the view point of acceleration shock, so that there will be no severe problem of acceleration shock.

It should also be noted that by using the means in accordance with the present invention to absorb the impacts applied to an aircraft during landing, it is possible to make the structure simple and light in weight.

As apparent from FIGS. 22 and 23, the only mechanical parts required in embodying the present invention are the shaft 3a, the eccentric member 4f, the support housing 2, the loaded housing 1 and bearings 5e and 6e. The number and the locations of the bearings, the eccentric member, the support housing and the loaded housing are not specifically limited. Thus, the present invention may be embodied in various ways.

In the arrangement shown in FIG. 27, the structure of FIG. 22 is modified in that the bearing bushing 5e is omitted and the shaft 3a is secured to the eccentric member 4f. The shaft 3a is also rotatably received in the hole 2d formed in the support housing 2 with the intervention of a bearing bushing 5a. In this arrangement, the shaft 3a is rotated about its axis together with the eccentric member 4f with respect to the support housing 2; however, since the loaded housing 1 has a freedom of circular movement, it is possible to obtain quite the same functions as in the previous embodiments, such as a spring function, a shock absorbing function, and so on.

In the arrangement of FIG. 28, the structure of FIG. 22 is modified in that the shaft 3a is inserted into the hole 2d with the intervention of a bearing bush 5a. In this arrangement, the loaded housing 1 has a freedom of circular movement with respect to the support housing 2 so that similar functions such as a spring function and a shock absorbing function can be obtained.

Another example of the present invention in which the loaded housing is embodied in a form of a vehicle wheel will now be described. The term suspension unit used herein is broad enough to include not only such a structure comprising a coil spring and a hydraulic damper encased in a cylindrical body as shown in FIG. 26 but also other types of automobile suspension system such as a wishbone type and Mac Farson type, Oleo damper unit used in an aircraft landing gear system, and other resilient support system for a car truck. Of course, the present invention is also applicable to a wheel support means such as that for a bicycle where any suspension unit is not used.

The support housing herein may include a forked member for a bicycle, a suspension unit for a motorcycle, an oleo damping strut for an aircraft, and a truck frame for a railway car, and is broad enough to include all members which serve to engage with and support end of axle adjacent to the vehicle body.

Therefore, it will be apparent from the above description that the shaft 3a must be rotatable with respect to at least one of the support housing 2 or 2a and the eccentric member 4f.

According to another aspect of the present invention, an eccentric member is provided on a support housing. An embodiment of the above described mode will now be described taking reference to FIGS. 29 and 30. A loaded housing 1 is provided with a hole 1d and a shaft 3a is inserted into the hole 1d to be secured thereto. The shaft 3a is rotatably inserted at each end thereof into a hole 4jd formed in an eccentric member 4j with the intervention of a bearing bush 5a. The hole 5a is offset from the axis of the eccentric member 4j so that it has a center axis extending parallel to the axis of the member itself. Each of the eccentric members 4j is rotatably supported by a support housing 2 having a hole 2d through a bearing bush 6a. The reference numeral 81 shows a ring-shaped bearing metal, and 82 an end plate. In the illustrated embodiment, the axis of rotation of the loaded housing 1 coincides with the center axis of the hole 1d.

In the illustrated embodiment, since the loaded housing 1 has a freedom of circular movement about the axis of eccentric members 4j which is fixed relative to support housing 2, similar functions as in the previous embodiments can be expected. Further, it should also be noted that, according to the present invention, the shaft 3a must be rotatable with respect to at least one of the loaded housing 1 and the eccentric member 4j.

According to a further mode of the present invention, an eccentric member may be provided on each of the support housing and the loaded housing.

An example embodying this feature will now be explained taking reference to FIG. 31. In the drawing, a loaded housing 1 is formed with a hole 1d for receiving a bearing bush 6e to rotatably support an eccentric member 4f. The eccentric member 4f has an eccentric hole 4fd which is offset from the axis thereof, and a shaft 3a is rotatably inserted into a bearing bush 5a mounted in the eccentric hole 4jd. Each end of the shaft 3a is rotatably supported by a bering bush 5a which is mounted in an eccentric hole 4jd formed in another eccentric member 4j, and the eccentric hole 4jd is at a position offset from the axis of the member 4j. Each of the eccentric members 4j supporting the opposite ends of the shaft 3a is rotatably mounted through a bearing bush 6a in a hole 2d formed in a support housing 2.

In this arrangement, the loaded housing has two modes of freedom of circular movement provided by the eccentric members 4f, 4j. As in the previous embodiments, the shaft 3a must be rotatable with respect to at least one of the eccentric members 4f, 4j.

When the loaded housing is embodied in a form other than a rotatable body such as a roll, a pulley, a grinding wheel and a vehicle wheel, it is very unlikely that only a single loaded housing is used except in a case of a piston or a swing arm. This is because that, as shown in FIG. 1, when a single loaded housing 1 is used to support a machine 9, the support becomes unstable due to the freedom of rotation α—α. Therefore, in may cases, a plurality of units, each including a loaded housing, a shaft, an eccentric member, a support housing and bearing means, are used to support a machine. In such a case, the units to be combined must satisfy the following requirements. Referring to FIG. 21 which shows only one example, the following relation must be established between two units.

In the following descriptions, in order to distinguish two devices, the parts of one device is designated with the addition of character $n$ to the reference numerals same as those of the other device.

1. The distance between the center P of the hole in the first loaded housing 1 and the center O of the hole 2d in the first support housing 2 must be equal to the distance between the center $P_n$ of the hole in the second loaded housing 1n and the center $O_n$ of the hole 2nd in the second support housing 2n:
2. The center lines P and $P_n$ must be parallel with each other:
3. The plane including the center lines P and $P_n$ must be parallel to the plane including the center lines O and $O_n$: and
4. The distance between the center lines P and $P_n$ must be equal to the distance between the center lines O and $O_n$.

Thus, according to further aspect of the present invention, there is provided an arrangement for surrounding a load, which comprises a loaded housing rotatable about an axis which can move along a circular path about a line spaced from and extending parallel to said axis, and a second loaded housing rotatable about a second axis extending therein, said second axis being able to move along a circular path about a second line spaced from and extending parallel to the second axis said first and second axes being parallel with each other, the plane including said two axes being parallel to the plane including said two lines, and the distance between said two axes being equal to the distance between said two lines.

FIGS. 32 and 33 show a further example of the present invention which is useful for an application subjected to a horizontal load. In the drawings, a loaded housing 1f is supported horizontally by an eccentric member 4f through a bearing bush 6e. The eccentric member 4f has an eccentric hole 4fd for receiving a shaft 3h through a bearing bush 5e. The shaft 3h is secured to a support housing or a foundation 8. It should be of course noted that the bearing bushes 5e and 6e may be substituted by thrust bearings. The reference numeral 83 shows a ring shaped bearing metal, and 84 an end plate.

Figure 34:
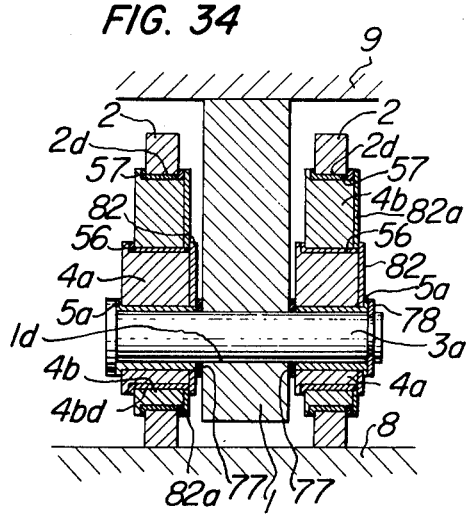
FIG. 34 is a sectional view of a further embodiment of the present invention.

FIG. 34 shows a dual eccentric ring arrangement to allow a dual circular movement of the shaft and the loaded housing so that an improved characteristics can be obtained. In the drawing, an outer eccentric ring 4b has an eccentric hole 4bd in which an inner eccentric ring 4a is received through a bearing bush 65. The outer eccentric ring 4b is rotatably supported by a support housing 2 at its hole 2d through a bering bush 57. A shaft 3a secured to a loaded housing 1 is rotatably received in an eccentric hole in the inner eccentric ring 4a through a bearing bush 5a. Thus, the shaft 3a and the loaded housing 1 are movable along two independent circular paths, one having a radius equal to the distance between the axis of that shaft 3a and the axis of the inner eccentric ring 4a and the other having a radius equal to the distance between the axes of the inner and the outer eccentric rings.

Similarly, a multi-eccentric ring arrangement can be provided by using a plurality of interengaging eccentric rings and inserting the shaft 3a into the innermost eccentric ring. As will be apparent, this arrangement provides a plurality of freedom of circular movement through an independent rotation of a certain eccentric ring with respect to the other eccentric rings. It is also possible to provide a plurality of eccentric members on the loaded housing and the members of the eccentric rings on the loaded housing may be different from the number of those on the support housing.

The multi-eccentric ring arrangement is similar in concept to the eccentric member of the previous embodiments in that the shaft is eccentrically supported. Thus, the eccentric member in the present invention includes the aforementioned multi-eccentric ring arrangement.

The eccentric member or members may be formed by a light weight material or provided with hollow portions so that the mass of the members may be reduced to improve the response to an external force.

Figure 35:
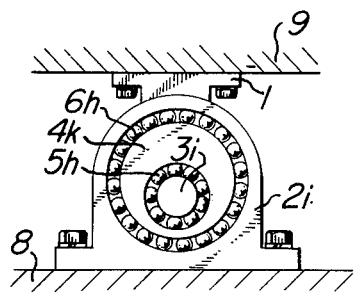
FIG. 35 shows a further embodiment of the present invention.

In the arrangement shown in FIG. 35, the radial dimension of the structure can be reduced by eliminating the necessity of providing separate bearing racings. In the drawing, the shaft 3i provides an inner race for balls 5h, the eccentric member 4k provides an outer race for the balls 5h, while the inner and outer races of balls 6h are provided by the eccentric member 4k and the support housing 2 respectively. The rolling surfaces of the balls 5h and 6h are heat treated.

Figure 36:
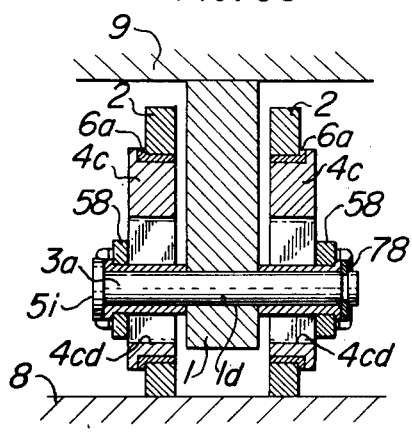
FIG. 36 is a sectional view showing a further embodiment of the present invention.
Figure 37:
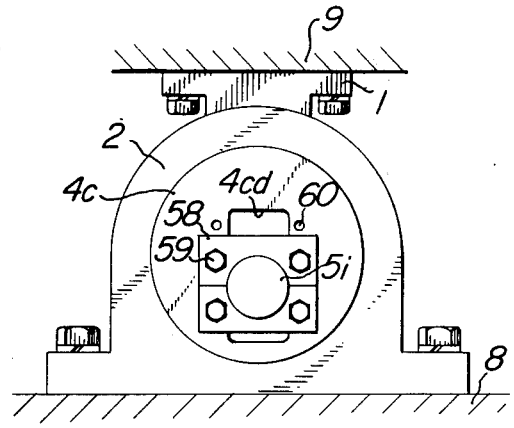
FIG. 37 is a front view of the arrangement shown in FIG. 36.

It is also possible according to the present invention to make the amount of eccentricity between the shaft and the eccentric member adjustable by using adjusting screws or bolts, as shown in FIGS. 36 and 37, in order that the eccentricity can be adjusted in accordance with the variations in load. In the drawings, a shaft 3a is at each end adjustably received in a slot 4cd formed in an eccentric member 4c and held in position through a bearing bush 5i by means of a clamp member 58 secured to the member 4c by a plurality of bolts 59 threaded into corresponding threaded holes 60. Thus, the eccentricity can be adjusted steppwise in accordance with the spacings between the threaded holes 60.

According to the present invention, it is also possible to make the interface between the eccentric member and the loaded housing or the support housing spherical so that a self-aligning feature can be obtained. When the structure is subjected to a thrust load, the interface may be made in conical shape.

An example including two perpendicularly extending shafts to provide circular movements in two planes is shown in FIGS. 38 and 39. In the drawings, a second shaft 3l is supported by clamping members 64 and extending perpendicularly to a first shaft 3a which is carried on the support housing 2 through the eccentric member 64. The second shaft 3l rotatably supports a second eccentric member 4l through a second bearing bush 5l. The second eccentric member 4l is rotatably mounted in a loaded housing 1l through a bearing bush 6l. The reference numeral 85 shows a ring shaped bearing metal, and 86 an end plate.

The loaded housing and the shaft, the eccentric member and the shaft, or the support housing and the shaft may be made integral by casting, forging or welding. In order to reduce the radial dimension, the eccentric member may be made of a bearing material so as to provide a sliding bearing surface.

In FIG. 40, there is shown a further embodiment of the present invention which utilizes a technique of self-aligning coupling so that the device of the present invention can operate smoothly even when it is subjected to an external force acting in the direction displaced from the direction perpendicular to the axis of the shaft. In this figure, a shaft 3e has a spherical projection 3f formed at substantially center part thereof so as to be received in a spherical eccentric hole 4ed of an eccentric member 4e through a bearing bush 5j. Further, the eccentric member 4e has a spherical outer surface which is received in a spherical hole 1fd of a loaded housing 1f through a bearing bush 6j. With this arrangement, the eccentric member 4e is allowed to rotate about any line passing through the center of the projection 3f and inclined to a plane perpendicular to the axis of the shaft 3e, so that the above object can be attained.

There are devices adapted to have a freedom of movement in an attachment portion between the loaded housing and the machine and the support housing and the foundation thereof. From the illustrated drawings, it will be noted that although a fixing method by means of the bolts has been used, however, a new freedom of movement may be obtained by interposing a resilient member between the means of the present invention and the other parts. A freedom of rotation will be further obtained by using a hinge, a thrust bearing or the like. Such a construction is effective to prevent a loss of efficiency of isolating the shock or the vibration to a number of external forces in the various directions.

From the foregoing descriptions, the followings will be clear to those skilled in the art. First of all, the freedom of circular movement is obtained by two eccentrically engaging parts. Further, a gravitational spring action can be obtained in response to the circular movement in a vertical plane of the loaded housing. The spring characteristics can be arbitrarily determined by the radius of the circular path. The arrangement is also effective to provide a vibration and shock preventing action. Moreover, the structure is quite simple and provides a sufficient strength. Particularly, when the loaded housing takes a form of a rotating body, additional features such as capabilities of setting initial tension of the belt, multiplying a displacement and controlling a pressure constantly can also be attained. When the present invention is embodied in a vehicle wheel, it is possible to attain a damping action utilizing a gravity and shock preventing action which is useful during aircraft landing.

Thus, the present invention has succeeded in producing a novel spring means which does not utilize any resiliency of a material but utilizes a freedom of circular movement and gravity. Particularly, the present invention has thrown away an established concept that a wheel must be aligned to an axle and sets forth, in applying to a vehicle wheel, a novel concept that the wheel should not necessarily be mounted concentrically with respect to an axle.

Accordingly, it will be apparent that the present invention has very broad utility such as in reducing a shock load encountered in a rolling mill, rolling dies, a grinding wheel, a construction machinery having a dozer blade or a bucket, suspension system of an automobile, a truck of a vehicle, landing gear system of an aircraft, seat support means which is effective to protect a passenger during collision of an automobile, and a horizontal vibration preventing system.

I claim:
1. A suspension for a vehicle wheel, said wheel having a first axis of rotation, comprising:
an axle for supporting said wheel,
first suspension means connected between said axle and the vehicle for providing a resilient connection to absorb shocks acting on the wheel having force components tending to move the wheel in a direction generally normal to the direction of travel of the vehicle; and
second suspension means connected between the wheel and the vehicle, said second means comprising at least one eccentric member mounted on said axle between said wheel and said first suspension means, said eccentric member causing said first axis of rotation of said wheel to move along an arc of a circle relative to a second axis fixed relative to said fist suspension means in response to generally horizontal forces acting transverse to said axis of rotation of said wheel, thereby providing a resilient connection to absorb shocks acting on the wheel having force components tending to move the wheel in a direction generally parallel to the direction of travel of the vehicle.

2. A vehicle wheel suspension according to claim 1, wherein said second suspension means comprises:
means for rotatably supporting the wheel about said at least one eccentric member with said second axis being the axis of said axle and being parallel to and radially spaced from the axis of said at least one eccentric member; and with the axis of said wheel coicident with the axis of said at least one eccentric member,
whereby the axis of said at least one eccentric member and said wheel is permitted to move circularly relative to the axis of said axle.

3. A vehicle wheel suspension according to claim 1, wherein said second suspension means comprises:
means for supporting the wheel on said axle with said first axis of the wheel and the axis of said axle coincident; and
means for rotatably supporting said at least one eccentric member within said first suspension means with the axis of said axle parallel to and spaced from the axis of said at least one eccentric member, said second axis being coincident with the axis of said eccentric member,
whereby the axis of said axle is permitted to move circularly relative to the axis of said at least one eccentric member.

4. A vehicle wheel suspension according to claim 2 wherein said vehicle is a motorcycle and said first suspension means comprises the telescopic front fork of said motorcycle.

5. A vehicle wheel suspension according to claim 3 wherein said vehicle is a motorcycle and said first suspension means comprises the telescopic front fork of said motorcycle.

* * * * *